United States Patent [19]

Case et al.

[11] Patent Number: 4,559,862

[45] Date of Patent: Dec. 24, 1985

[54] PACKING MATERIAL

[75] Inventors: Edward M. Case, Weston; Chester S. Hopper, Newtown, both of Conn.

[73] Assignee: The Marlo Company Incorporated, Newton, Conn.

[21] Appl. No.: 366,107

[22] Filed: Apr. 6, 1982

Related U.S. Application Data

[63] Continuation-in-part of Ser. No. 133,049, Mar. 24, 1980, abandoned.

[51] Int. Cl.$^4$ ................................. D06P 7/00
[52] U.S. Cl. ........................................... 87/1; 277/230; 428/241; 428/244; 428/245; 428/253; 428/254; 428/323; 428/367; 428/373; 428/377; 428/421; 87/6; 87/8
[58] Field of Search ............... 428/241, 244, 245, 260, 428/297, 299, 302, 324, 331, 373, 377, 421, 425, 253, 254, 323, 367; 87/1, 6, 9, 8; 277/230

[56] References Cited

U.S. PATENT DOCUMENTS

| | | |
|---|---|---|
| 3,124,032 | 3/1964 | Webster et al. ............... 87/1 |
| 3,196,737 | 7/1965 | Wilkinson ................... 87/8 |
| 3,306,155 | 2/1967 | Zumeta et al. ............... 87/1 |
| 3,403,595 | 10/1968 | Watson ....................... 87/1 |
| 3,513,943 | 5/1970 | Ernst et al. ................. 87/1 |
| 3,534,652 | 10/1970 | Zumeta et al. ............... 87/1 |
| 3,646,846 | 3/1972 | Houghton et al. ........... 87/1 |
| 3,778,334 | 12/1973 | Sturgeon ..................... 428/285 |
| 4,304,811 | 12/1981 | David et al. ................. 428/245 |
| 4,502,364 | 3/1985 | Zucker ........................ 428/373 |

OTHER PUBLICATIONS

"Standard Marlo Packaging" Product Bulletin No. 14.

Primary Examiner—James J. Bell
Attorney, Agent, or Firm—Blum Kaplan Friedman Silberman & Beran

[57] ABSTRACT

A packing material comprises glass or other inorganic fibers in combination with organic fibers such as sintered polytetrafluoroethylene (TFE) or other selected fibers with or without an impregnant, a preferred impregnant being a lubricant with a binder. Ceramic fiber or quartz fiber can be substituted for glass fiber. Specific metal disulfides or talc can be substituted for the dispersed graphite and dispersed polytetrafluoroethylene (TFE) can be used as a binder for the lubricant. Aramid, polyethylene, polypropylene, graphite, carbon, vegetable, nylon or rayon fibers or filaments can be substituted for the sintered TFE fiber in combination with inorganic fiber.

33 Claims, 6 Drawing Figures

U.S. Patent   Dec. 24, 1985   Sheet 1 of 3   4,559,862 ized, most widely used material in braided "compression" packings. The recent discovery of the potential carcinogenic effects of asbestos, as well as the fact that usable supplies of the raw material are naturally limited as well as not widely distributed geographically and, hence, subject to political restraints, has caused a wide search for alternative materials in the fluid sealing industry. In a patent issued to one of us (U.S. Pat. No. 3,306,155), it was disclosed that the substitute material is glass fiber, in combination with polytetrafluoroethylene (TFE) dispersion, forms a braided packing which is effective for a number of applications. However, glass fiber is attacked by alkalis and so cannot be used in such an environment. Also, it has a tendency to abrade on itself.

PACKING MATERIAL

REFERENCE TO RELATED APPLICATIONS

The present application is a continuation-in-part of our previous application having the Ser. No. 133,049 and filed Mar. 24, 1980 now abandoned.

BACKGROUND OF THE INVENTION

Until very recently, asbestos has been the standard, most widely used material in braided "compression" packings. The recent discovery of the potential carcinogenic effects of asbestos, as well as the fact that usable supplies of the raw material are naturally limited as well as not widely distributed geographically and, hence, subject to political restraints, has caused a wide search for alternative materials in the fluid sealing industry. In a patent issued to one of us (U.S. Pat. No. 3,306,155), it was disclosed that the substitute material is glass fiber, in combination with polytetrafluoroethylene (TFE) dispersion, forms a braided packing which is effective for a number of applications. However, glass fiber is attacked by alkalis and so cannot be used in such an environment. Also, it has a tendency to abrade on itself.

While each of the substitute materials on the market, such as glass fiber in combination with TFE dispersion, TFE fiber, graphite filament, etc., has substantial functional merit, they are considerably more expensive than the standard graphited asbestos packing which has been the predominant braided packing for many years. The search for an economical substitute, one which will be equivalent in cost to graphited asbestos packing, has not yet been successful.

Attempts have been made to incorporate graphite lubricant or other non-performance-limiting lubricants into a braided glass fiber structure. These attempts have hitherto yielded unsatisfactory results. Dry, flake graphite will not be retained by a braided glass fiber structure. When the graphite is mixed with an oil lubricant, the oil will seep out and not be retained; furthermore, the use of oil limits the effective operating temperature range of the packing. Also, the wet, dripping packing so constructed would create both housekeeping and safety problems. Adding graphite to a more coherent, waxy lubricant would help to retain the graphite in the structure. However, this mixture would fundamentally amount to a wax filler in which the graphite would have no significant value; furthermore the wax would limit the effective temperature of the packing to a very low range. An aqueous graphite dispersion also will not be retained in the braided glass fiber structure.

Experience derived from graphited asbestos packing offers no clear path to the development of a viable graphited glass fiber packing. The ordinary asbestos yarn of commercial grade or better used in the manufacture of braided packing contains up to 25% or even more of a cotton or rayon binder which readily absorbs and forms a reservoir of lubricant permitting the finished product to retain the lubricant within the braided structure indefinitely. Furthermore, the inherent structure of asbestos, containing multifarious voids as the result of uneven and very small and varied fibers which are incorporated into the yarn (as opposed to the smooth, regular filamentary nature of glass fiber), permits the retention of graphite-laden lubricants (or mica-laden, talc-laden or other particulate-laden mixtures) as well as flake graphite in dry, powdered form. Thus, braided asbestos packing has been easy and convenient to load with lubricants and the technique of doing so is well known.

Attempts to use the same technique on braided glass fiber have met with failure owing to the inherent characteristics of this fiber. Lately, attempts have been made to use more sophisticated, aqueous-based graphite-laden dispersions and inorganic lubricants such as molybdenum disulphide and titanium disulphide, for the same purpose. Such dispersions are available from Joseph Dixon Co., and, differing from the traditional mixture of graphite and oil, they do appreciably penetrate the glass fiber structure. However, two difficulties have been found with such materials. In the first place, they tend to wear off or, under pressure, blow out of a glass fiber braided structure more readily than from braided asbestos, since they are not held and protected by the same irregular fibrous structure nor are they suspended in a retained lubricant vehicle. Secondly, when such dispersions are applied and the packing dries, a hairy, brush-like surface emerges on the outer surface of the packing. Since a prime desideratum of any packing is a smooth, antifrictional surface, such a packing becomes highly suspect from a tactile point of view to the normal user who is accustomed to use "smoothness" of finish as one of the criteria for packing evaluation.

Wilkinson in U.S. Pat. No. 3,196,737 has described a gland-packing material consisting of asbestos cords and unsintered TFE cords braided together; unsintered TFE cords are usually produced by extruding coagulated TFE through a die. Unsintered TFE deforms so readily under stress that it can contribute nothing to the mechanical strength of such a packing, and so must be regarded essentially as a solid lubricant similar to dispersed TFE after drying, rather than as an organic fiber. Consequently, the packing of asbestos fiber or cord in combination with unsintered TFE cord has essentially the characteristics of a lubricated asbestos. Although relatively low in cost, the combination is carcinogenic, as are other asbestos-based packings. Accordingly, it would be highly desirable to develop a non-asbestos packing which enjoys the advantage of resilience contributed by suitable filaments and in which the solid lubricant is relatively inexpensive. The packing taught herein meets these objectives.

SUMMARY OF THE INVENTION

A packing material in accordance with the present invention, whether braided, knitted or both, derives its resilience and good thermal conductivity from inorganic fiber such as glass fiber, quartz fiber or ceramic fiber, asbestos fiber being excluded from the category, and derives a major portion of its conformability and resistance to abrasion from an organic fiber in combination with the inorganic fiber.

In certain applications, packings in which organic fibers are combined may be operated without a lubricant. However, in most appliations, impregnants including a lubricant improve the performance of the packing. An effective lubricant for the packing is graphite incorporated in the packing as a dispersion. A binder, either dispersed TFE or starch, the principal function of which is to retain the dispersed graphite or selected substitute therefor, may be incorporated in the packing. In addition, the TFE dispersion functions as a sealant and as a lubricant. Molybdenum disulphide, titanium disulphide, tungsten disulphide or talc or combinations thereof may be substituted in part or completely for the graphite, and starch in part or completely, may be substituted for the TFE dispersion. Starch is useful only when the liquid to be retained by the packing is non-aqueous. The packing may be impregnated with an inorganic lubricant alone or with TFE dispersion alone in any ratio so that the content of TFE in the impregnant may vary from 0 to 100%.

Where the liquid to be retained by the packing does not attack ordinary glass, either electrical, structural grade or high-strength glass fibers are satisfactory; where the liquid to be retained by the packing will attack electrical, structural or high-strength glass fibers, chemical-grade glass fibers are used. Ceramic or quartz fiber may be substituted for the glass fiber.

At least one of the organic fibers, sintered TFE, aramid, nylon, rayon, polyethylene, polypropylene, vegetable, graphite or carbon fibers, suitable vegetable fibers being hemp, cotton, jute, flax and ramie is used in combination with the glass fiber, the organic fiber providing protective barriers against glass-to-glass abrasion. Preferred combinations of fibers are glass fibers with sintered TFE fibers and glass fibers with aramid fibers. It is to be noted that the term TFE as used herein in reference to fibers will indicate the sintered material only, and thus distinguishes from the unsintered material.

Where the vitreous fiber is glass fiber and the organic fiber is sintered TFE fiber, the content of such TFE fiber in such a combination may be from 5 weight percent to 95 weight percent. The preferred inorganic fiber content is from 45 to 95 weight percent for cost saving, and from 65 to 90 weight percent for the optimum combination of cost and performance.

Where an inorganic fiber is combined with an organic fiber of considerably greater cost, such as TFE, aramid, graphite, carbon or ramie, then the additional cost of TFE dispersion is relatively unimportant so that the dispersed lubricant may be from 0 to 100%, as aforenoted, but is more usually from 5 percent up to 100 percent TFE. However, even in such fiber combinations it may be preferable to incorporate up to 90 weight percent of dispersed graphite with the remainder TFE dispersion as the binder.

In another embodiment of the invention a jacket of an inorganic fiber in combination with organic fiber is braided or knitted over a core of a relatively inexpensive organic fiber the core being formed by twisting, spinning or lay-up. Suitable core materials are jute, polypropylene, polyethylene, nylon, hemp, cotton and rayon. The price of ramie may also relatively decrease to the point where it would be useful. The lubricant may be from .50 to 95 weight percent inorganic with the remainder dispersed TFE or starch. It is preferably from 60 to 90 weight percent inorganic.

Accordingly, an object of the present invention is a packing of low cost which can be substituted for asbestos-based packings which, in view of the well-known toxicity of asbestos, have become objectionable to many users, the packing disclosed herein being suitable for use over a wide range of temperatures and as sealant and lubricant for a wide range of solutions and solvents.

Another object of the present invention is a packing which retains its effectiveness at high shaft speeds.

A further object of the present invention is a packing of high thermal conductivity.

A significant object of the present invention is a packing combining braided-together or twisted and knitted together inorganic and organic fibers.

An important object of the present invention is a braided or knitted packing of inorganic fibers in combination with organic fibers over a core of relatively inexpensive organic fiber.

Still another object of the present invention is a packing having controlled resilience and cold flow.

Yet another object of the present invention is a packing lubricated with an inorganic dispersion and a binder of dispersed TFE or starch.

Still other objects and advantages of the invention will in part be obvious and will in part be apparent from the specification.

The invention accordingly comprises an article of manufacture possessing the features, properties, and the relation of elements which will be exemplified in the article hereinafter described, and the scope of the invention will be indicated in the claims.

BRIEF DESCRIPTION OF THE DRAWINGS

For a fuller understanding of the invention, reference is had to the following description taken in connection with the accompanying drawings, in which.

DESCRIPTION OF THE PREFERRED EMBODIMENTS

Figure 1:
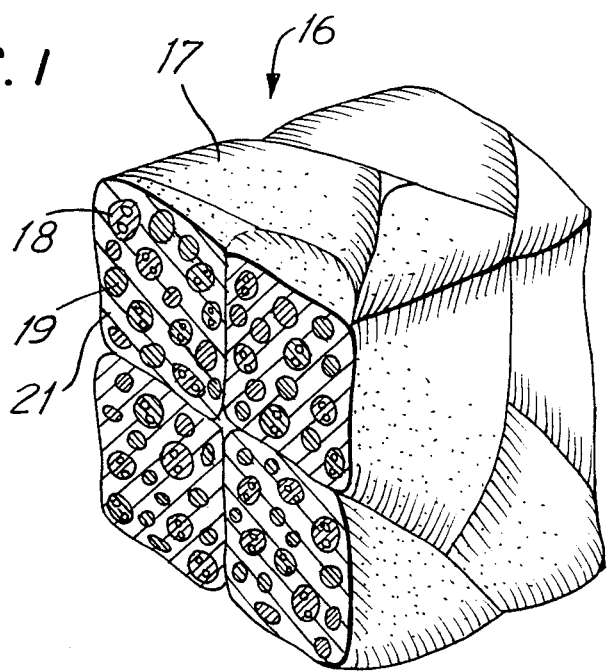
FIG. 1 is a cross-section perspective view of a packing in accordance with the present invention, said packing including both organic and inorganic fibers.

The search for non-asbestos fluid-sealing materials has led to the development of packings and gaskets composed of sintered TFE fiber, aramid fiber, graphite and carbon fiber, used individually. While these all function well for many purposes, the performance of the organic fibers can be improved significantly by being combined in a braided, knitted or twisted structure, or a combination thereof, with glass, quartz or ceramic fiber; by the same token it may be said that a braided, knitted or twisted structure, of such an inorganic fiber is significantly improved by the admixture of a quantity of TFE, aramid, polyethylene, polypropylene, nylon, rayon, vegetable, graphite or carbon fibers, individually or in combination, for given sealing purposes.

When combined with sintered TFE fiber, vitreous or inorganic fiber adds strength to the structure and thus increases its ability to retain a fluid under pressure. The well known cold-flow properties of sintered TFE fiber are thereby controlled, thus increasing both the efficiency of installation and the life of the packing or gasket. Indeed, the normally undesirable cold-flow characteristic of sintered TFE fiber is converted, when combined with inorganic fiber, into a positive asset since, under the calendering normal in the packing manufacturing process, or in die-forming, or under the compressive force needed to install rings of packing in a stuffing box, the TFE fiber will flow sufficiently into the interstices of the structure comprising both inorganic and organic fibers to make a denser seal than an all-fiberglass seal and a more pressure-resistant seal than an all-TFE-fiber seal. Additionally, inorganic fiber, in combination with sintered TFE fiber, helps to conduct heat away from the wearing surface to the wall of the stuffing box, thus raising the practical temperature limit of the fluid being pumped, since the operative limit of the packing is set by the service fluid temperature and frictional heat generated within the stuffing box. Also, inorganic fiber, by compacting in the softer matrix of sintered TFE, adds resiliency and density to the braided structure, so that excessive installation tightening in either the stuffing box (in the case of dynamic packing) or on a flange (in the case of gaskets) is less likely to occur because the installer will feel more warning resistance.

When combined with aramid fiber the inorganic fiber again helps to conduct heat away from the wearing or contact surface. Morever, inorganic fiber is much more resistant to a variety of chemicals than is aramid fiber; thus a mixture of the two is an improvement in this important respect.

When combined with graphite or carbon fiber the inorganic fiber adds strength to the structure, forming a supportive web which offsets the well-known fragility of carbon and graphite yarns. By increasing the strength of the braided structure the inorganic fiber permits easier installation and reduces the effects and the possibility of over-tightening on installation, which is a major cause of graphite or carbon filament packing failure.

The admixture of the aforenoted organic fibers with glass or other inorganic fibers decreases the tendency which inorganic fiber has to abrade upon itself when used alone, a potential cause of packing or gasket failure when excessive torque is applied or when the packing's lubricant is dissipated. Thus, the utility of glass fiber as a packing or gasket material is reciprocally improved by the described mixtures.

In each of the above described combinations lubrication may or may not be used, as specific requirements may indicate.

Each of the above-described combinations may be achieved by braiding, knitting or twisting strands of the separate fibers, or strands in which the fibers are commingled, or both. A strand may consist of one or more yarns of material as received from the fiber manufacturer. Where an individual strand containing both inorganic and organic fibers is to be used in forming a knitted structure, the inorganic and organic fibers are preferably first twisted together to from the strand.

Braids may be in the three forms most commonly used in the fluid sealing industry, i.e., square braiding (or plaiting), cross-locking (or interlocking), and braid-over-braid. Other forms of braiding may be used where desirable. In the braid-over-braid construction, which consists of a jacket or a series of jackets, one over the other to achieve a desired size, each jacket may be a combination of inorganic and organic fiber strands, or the jackets may be exclusively of inorganic fiber or organic fiber, in whatever sequence of layers is desirable so long as the external layer is at least in part organic fiber. Also, when two layers of inorganic fiber are used, there must be an additional layer of organic fiber or organic fiber commingled with inorganic fiber separating the two layers of inorganic fiber. The additional layer may also be knitted or braided.

A braided packing in accordance with the present invention is indicated generally in FIG. 1 by the reference numeral 16. The braided material is a combination of an organic fiber with a vitreous fiber, i.e., an inorganic fiber, suitable vitreous fibers being of glass, ceramic or quartz, glass fibers being preferred because of lower cost. Glass fibers are available in electrical, structural, high-strength or chemical grades, the last being resistant to a wider range of chemicals and somewhat more expensive than the others. The structural-grade fibers can be used at a higher temperature than the others. A specific fiber to be used is selected on the basis of chemical resistance, strength, the maximum temperature to which the packing is to be exposed, and cost. Where bulk is desired, texturized inorganic fibers are used, and the representations of the packings of the Figures are to be considered as showing texturized inorganic fiber in combination with organic fiber. The vitreous fibers, whether texturized or not, provide the necessary resilience to conform to the interior of a stuffing box and the exterior of a shaft while exerting pressure against both the box and the shaft. The fibers are preferably impregnated with appropriate material to improve the seal. TFE dispersion has been found to be effective in the retention of other inorganic lubricants such as molybdenum disulfide, titanium disulphide, tungsten disulphide and talc. Graphite is the preferred inorganic lubricant. Also, starch has been found to be effective as a replacement for TFE in retaining the inorganic lubricants in the packing. However, starch can be used only in connection with nonaqueous solvents or solutions, since it is sensitive to water.

Suitable organic fibers for use in combination with inorganic fibers are sintered TFE fiber, aramid, sold under the trade name of "Kelvar" by DuPont, nylon, rayon, polyethylene, polypropylene, carbon and graphite fibers. Vegetable fibers such as flax, jute, cotton, hemp, rayon and ramie are also useful in certain applications. Aramid, an aromatic polyamide, is a generic name assigned by the Federal Trade Commission. Addition of as little as five parts by weight of TFE fiber to ninety-five parts by weight of vitreous fiber facilitates the braiding or knitting of the materials and substantially reduces abrasion, evidently by reducing the number of glass-to-glass contacts. The content of the organic fiber in the combination is preferably, but not necessarily, held to a minimum because of the cost thereof. The addition of a suitable lubricant as disclosed herein, under the compressive force of gland pressure incidental to the installation or subsequent adjustment of the packing, also serves to mitigate glass-to-glass contacts, thus contributing to prevention of self-abrasion of vitreous fibers in addition to functioning as a sealant and lubricant.

A structure based on the combination of a vitreous fiber with an organic fiber is shown in FIG. 1, in which a braided structure is indicated generally by the reference numeral 16. Each of the strands 17 comprises vitreous fibers 18 and organic fibers 19. The vitreous and organic fibers may be laid up together, twisted together or spun together; the space between the fibers is filled with impregnant 21, which may be a dispersed inorganic material such as graphite or a metal disulphide or talc, either alone or in combination with an organic binder such as dispersed TFE or starch, or the impregnant may be an organic dispersion alone; the content of organic binder in the impregnant may thus be from 0 to 100%.

Structures in which the vitreous fibers are combined with organic fibers are particularly useful for reciprocating shafts. However, they are also useful for rotating shafts. In general, the minimum quantity of organic fiber which provides a substantial increase in the life of a packing is about 5 weight percent and may be as high as 95 weight percent of the total fiber content. For long life, at reasonable cost, the organic fiber content is preferably from 5 to 55 weight percent of the total fiber content. For the optimum combination of long life and cost, the organic fiber content is from 10 to 35 weight percent of the total fiber content. The preferred vitreous fiber is glass fiber, either electrical, structural, high-strength or chemical grade, depending upon the liquids which are to be retained and the operating conditions. The preferred organic fiber so far as conformability is concerned is sintered TFE fiber. The preferred inorganic lubricant, on the basis of expense, is graphite, generally available as an aqueous dispersion. The preferred organic binder is TFE dispersion. Disperses TFE, as aforenoted, may also serve as the sole lubricant.

Where graphite is present as a lubricant, corrosion of the metals in contact with the packing may result. In such circumstances a minor quantity of powdered zinc is added as a corrosion inhibitor.

Figure 2:
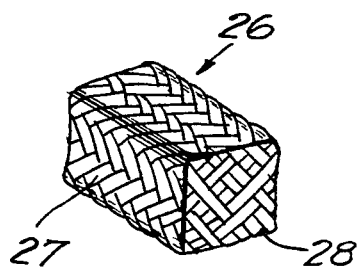
FIG. 2 is a similar view of a packing in accordance with the present invention in a cross-lock construction.

In the embodiment of FIG. 2 a packing 26 in crosslock construction is shown. The diagonal construction is shown at cut end 28. Each of the strands 27 comprises a vitreous and an organic fiber.

Figure 3:
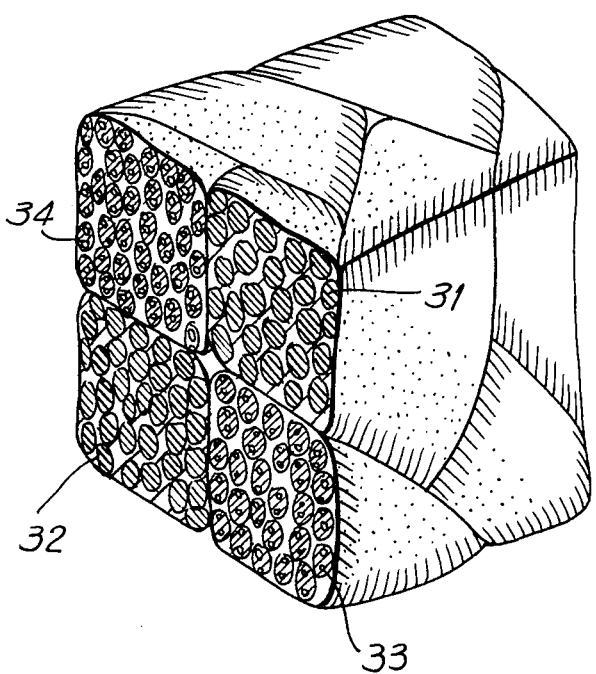
FIG. 3 is a similar view of an embodiment in which strands of vitreous fiber are combined with strands of organic fiber.

In the embodiment shown in FIG. 3, strands 31 and 32 consist essentially of inorganic fibers and strands 33 and 34 consist essentially of organic fibers, suitable inorganic fibers being those aforenoted and suitable organic fibers also as aforenoted. The packing is impregnated with a lubricant and a binder as aforenoted in connection with construction in which each individual strand includes both inorganic and organic fiber. For specific applications a packing in which each strand consists of only one type of fiber may be found to outperform a packing in which each strand contains both inorganic and organic fibers. In addition, it is less costly to manufacture since the step of forming the strands from a combination of fibers may be omitted.

Figure 4:
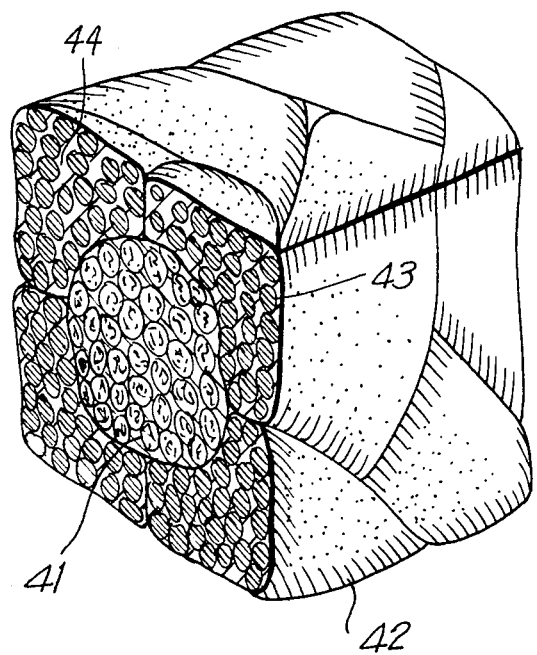
FIG. 4 is a similar view of an embodiment including a jacket of vitreous fiber in combination with organic fiber over a core of organic fiber.

In the embodiment shown in FIG. 4, a core 41 of a relatively inexpensive organic fiber is covered with a braided jacket 42 of fiber 43 which may contain from 2 to 50 weight percent of more expensive fiber such as aramid, the remainder being inorganic fiber. Where aramid or other organic fiber is present in the jacket, the glass and organic fibers may be twisted, spun or laid up together. Also, strands of glass fiber may be braided together with strands of organic fiber. Aramid is the preferred organic fiber, where high strength is needed. The packing is lubricated with a dispersed inorganic material such as graphite, $MoS_2$, $TiS_2$, $WS_2$ or talc in combination with dispersed TFE or starch as binder, the combined dispersion being indicated by the reference numeral 44. The inorganic fiber may be of electrical, structural, high-strength or chemical glass and the organic fiber of the core is of a relatively inexpensive material such as polyethylene, polypropylene, hemp, jute, flax, cotton, rayon, nylon or ramie (the ramie being useful only if the cost is low enough). The organic fiber of the core may be spun, twisted, laid up or braided and FIG. 4 is to be regarded as showing the organic fiber in any of these constructions. The ratio of inorganic lubricant to organic binder is preferably from 50:50 to 95:5 by weight with the more preferred range on the basis of effectiveness and cost being 60:40 to 90:10 by weight. The ratio of the jacket weight to that of the organic fiber in the core may range from 10:90 to 90:10 depending upon the service and the relative costs of the materials, but is preferably from 20:80 to 80:20.

Figure 5:
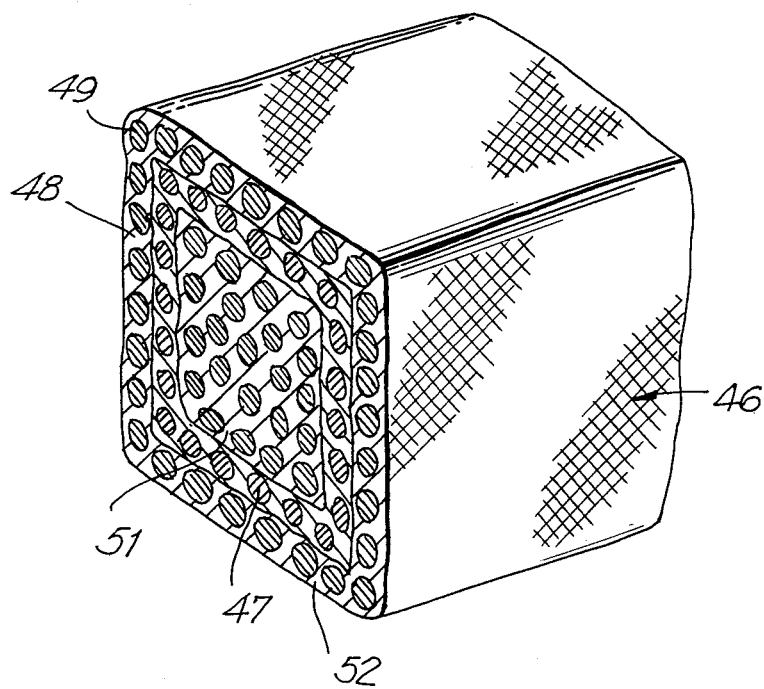
FIG. 5 is a similar view of an embodiment including knitted fiber.

FIG. 5 shows a packing indicated generally by the reference numeral 46 wherein inorganic and organic fibers may be present in knitted form. Although knitted glass fibers without organic fibers have been used as gasketing, such knitted glass fiber constructions are unsuitable for use as packing due to the tendency to abrade by glass-to-glass impingement and to the fact that knitted goods unravel when the yarn is broken. Nevertheless, knitted inorganic fiber is useful in packing when properly protected. Packing 46 comprises a layer 47 of knitted glass fibers. Layer 47 is protected by a jacket 48 in which the strands 49 are preferably of an organic fiber such as sintered TFE, aramid, nylon, rayon, polyethylene, polypropylene, vegetable, graphite or carbon, suitable vegetable fibers being hemp, cotton, jute, flax and ramie. The strands 49 may be of glass fibers commingled with the aforenoted organic fibers, in which case the inorganic and organic fibers are twisted together prior to knitting. Moreover, the representation of packing 46 as shown in FIG. 5 is to be considered as showing either a knitted or a braided jacket 48 over a knitted glass-fiber layer 47. FIG. 5 shows the layers 47 and 48 over a core 51 which may have the same content as jacket 48 or as the core 41 in FIG. 4. Optionally, core 51 may be completely absent or may consist of additional layers such as 47 and 48 in alternation or any other suitable construction.

Preferably, the packing of FIG. 5 is impregnated with a lubricant having compositions such as recited in connection with the packings of FIGS. 1-4. A lubricant is essential where glass-to-glass impingement can lead to breakage of a strand and cause unraveling.

Where inorganic and organic fibers are to be twisted together and then knitted, the content of organic fiber in the strand can be from 2 to 50 percent by weight. Preferably, the content of organic fiber in the strand is from 10 to 50 percent by weight in order to minimize any possibility of breakage by abrasion. Furthermore, as aforenoted, the entire packing is preferably impregnated with a lubricant 52.

Figure 6:
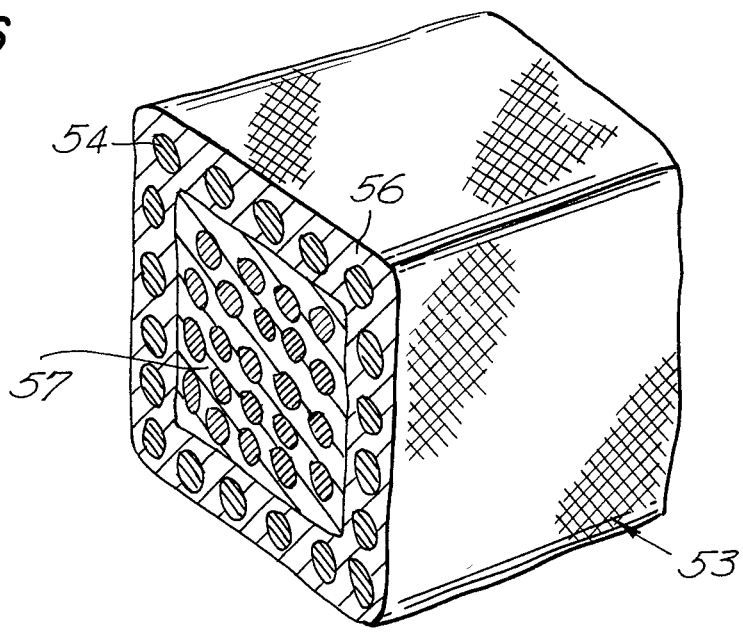
FIG. 6 is a similar view of another embodiment including knitted fiber.

FIG. 6 represents a packing indicated generally by reference numeral 53 wherein at least the outer portion thereof is knitted of commingled glass and organic fibers 54 which have been twisted together prior to knitting. Fibers 54 are shown as forming a jacket 56 over a core 57 of materials similar to those described in connection with core 41 of FIG. 4. Alternatively, core 57 may be absent, in which case the entire packing is made of commingled fibers 54. Also, packing 53 is preferably impregnated with lubricants having the aforenoted compositions.

It will thus be seen that the objects set forth above, among those made apparent from the preceding description, are efficiently attained and, since certain changes may be made in the above article without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. Compression packing, comprising at least two braided strands of a first fiber being an inorganic fiber and at least one of a second fiber being an organic, carbon or graphite fiber in combination, said braided strands impregnated with an impregnate including a binder for improving the sealant properties of the packing and said first fiber being an inorganic fiber selected from the group consisting of electrical-grade glass, structural-grade glass, high-strength glass, chemical-grade glass, ceramic and quartz fibers, said second fiber being selected from the group of an organic fiber selected from the group consisting of sintered polytetrafluoroethylene (TFE), polyethylene, polypropylene, aramid, nylon, rayon flax, ramie, hemp, jute and cotton, carbon and graphite fibers, the content of inorganic fiber in said combination being from 5 to 95 weight percent.

2. Packing, as claimed in claim 1, wherein said inorganic fiber content is from 45 to 95 weight percent.

3. Packing, as claimed in claim 1, wherein said inorganic fiber content is from 65 to 95 weight percent.

4. Packing, as claimed in claim 1, wherein said strands consist of inorganic fibers and at least one fiber from the group of organic, carbon or graphite fibers spun together.

5. Packing, as claimed in claim 1, wherein said strands consist of inorganic fibers and at least one fiber from the group of organic, carbon or graphite fibers twisted together.

6. Packing, as claimed in claim 1, wherein said strands consist of inorganic fibers and at least one fiber from the group of organic, carbon or graphite fibers laid-up together.

7. Packing, as claimed in claim 1, wherein said packing comprises first strands consisting of inorganic fibers and second strands consisting of at least one fiber from the group of organic, carbon or graphite fibers, said strands being braided together.

8. Packing as claimed in claim 1, 2, 3, 4, 5, 6 or 7, wherein the impregnant includes an inorganic lubricant selected from the group consisting of dispersed graphite, $MoS_2$, $TiS_2$, $WS_2$, talc and combinations thereof dispersed in the impregnant.

9. Packing, as claimed in claim 8, wherein said binder is selected from the group consisting of dispersed TFE and starch.

10. Packing, as claimed in claim 9, wherein said binder is dispersed TFE.

11. Packing, as claimed in claim 8, wherein the content of graphite in said impregnant is from 50 to 95 weight percent.

12. Packing, as claimed in claim 8, wherein the content of graphite in said impregnant is from 60 to 90 weight percent.

13. Packing, as claimed in claim 1, 2, 3, 4, 5, 6 or 7, wherein the impregnant consists essentially of 0 to 100% dispersed polytetrafluoroethylene (TFE), any remainder being dispersed graphite.

14. Packing, as claimed in claim 13, wherein the content of dispersed TFE in said impregnant is from 5 to 95 weight percent.

15. Packing, as claimed in claim 1, wherein said inorganic fiber is glass fiber and said glass fiber is texturized for increasing the bulk volume thereof.

16. Packing comprising a core of an inexpensive organic fiber, a braided jacket of inorganic fiber in combination with at least one fiber from the group of organic, carbon or graphite fiber over said core and an impregnant consisting of from 50 to 95 weight percent of dispersed material selected from the group consisting of graphite, $MoS_2$, $TiS_2$, $WS_2$ and talc and from 5 to 50 weight percent of a binder selected from the group consisting of dispersed polytetrafluoroethylene and starch.

17. Packing, as claimed in claim 16, wherein said inorganic fiber is selected from the group consisting of chemical, structural, high-strength and electrical grade glass fiber, quartz fiber and ceramic fiber.

18. Packing, as claimed in claim 16 or 17, wherein said inexpensive organic fiber is selected from the group consisting of jute, flax, hemp, cotton, ramie, nylon, rayon, polyethylene and polypropylene.

19. Packing, comprising a core of an inexpensive organic fiber, a braided jacket of inorganic fiber over said core and an outer jacket of organic fiber over said jacket of inorganic fiber.

20. Packing, as described in claim 19, wherein said fibers in said outer jacket are selected from the group consisting of sintered polytetrafluoroethylene, aramid, graphite and carbon fibers.

21. Packing, as described in claim 20, wherein said fiber in said outer jacket is aramid.

22. Packing, as defined in claim 19, wherein said packing comprises an impregnant selected from the group consisting of $MoS_2$, $WS_2$, $TiS_2$ and talc alone or in combination with a member of the group consisting of dispersed polytetrafluoroethylene and starch.

23. Packing, comprising a core of inexpensive organic fiber and a braided jacket over said core, said organic fiber being selected from the group consisting of jute, flax, hemp, cotton, ramie, nylon, rayon, polyethylene and polypropylene, said braided jacket being formed of strands each consisting of inorganic and jacket organic fibers laid up, twisted or spun together, the content of jacket organic fiber being from 2 to 50 weight percent and said jacket organic fiber being selected from the group consisting of sintered polytetrafluoroethylene, polyethylene, polypropyline, aramid nylon, rayon, flax, ramie, hemp, jute, cotton, carbon and graphite fibers.

24. Packing, as claimed in claim 23, wherein said packing further comprises an impregnant selected from the group of lubricants consisting of graphite, $MoS_2$, $TiS_2$, $WS_2$ and talc, and a binder selected from the group consisting of dispersed polytetrafluoroethylene and starch.

25. Packing, as claimed in claim 23, wherein the weight ratio of said binder to said lubricant lies between 5:95 to 50:50.

26. Packing, as claimed in claim 23, wherein the weight ratio of binder to said lubricant lies between 40:60 to 90:10.

27. Packing, as claimed in claim 23, wherein the ratio of the weight of said jacket to that of said core lies between 10:90 and 90:10.

28. Packing, as claimed in claim 23, wherein the ratio of the weight of said jacket to that of said core lies between 20:80 and 80:20.

29. Packing, comprising knitted strands of inorganic fiber twisted together with at least one fiber from the group of organic, carbon or graphite fiber, and an impregnant comprising an inorganic lubricant selected from the group consisting of dispersed graphite, MoS$_2$, TiS$_2$, WS$_2$ and talc.

30. The packing, as defined in claim 29, wherein said impregnant further comprises an organic binder selected from the group consisting of polytetrafluoroethylene (TFE) and starch.

31. The packing, as defined in claim 29 or 30, further comprising a core within said packing, said core being surrounded by said knitted strands and being of organic fibers selected from the group consisting of jute, flax, hemp, cotton, ramie, nylon, rayon, polyethylene and polypropylene.

32. Packing, as claimed in claim 29, further comprising an impregnant including a lubricant.

33. Compression packing comprising at least two braided strands of a twisted yarn of at least one glass fiber and at least one aramid fiber the content of the glass fiber in said yarn being from 5 to 95 weight percent and including an impregnant including tetrafluoroethylene and a lubricant.

* * * * *